2 Sheets—Sheet 1.
O. ROMANZE.
Assignor to MASON, THORNTON & ROMANZE.
ELECTRIC ARC LAMP.
No. 10,738. Reissued June 22, 1886.
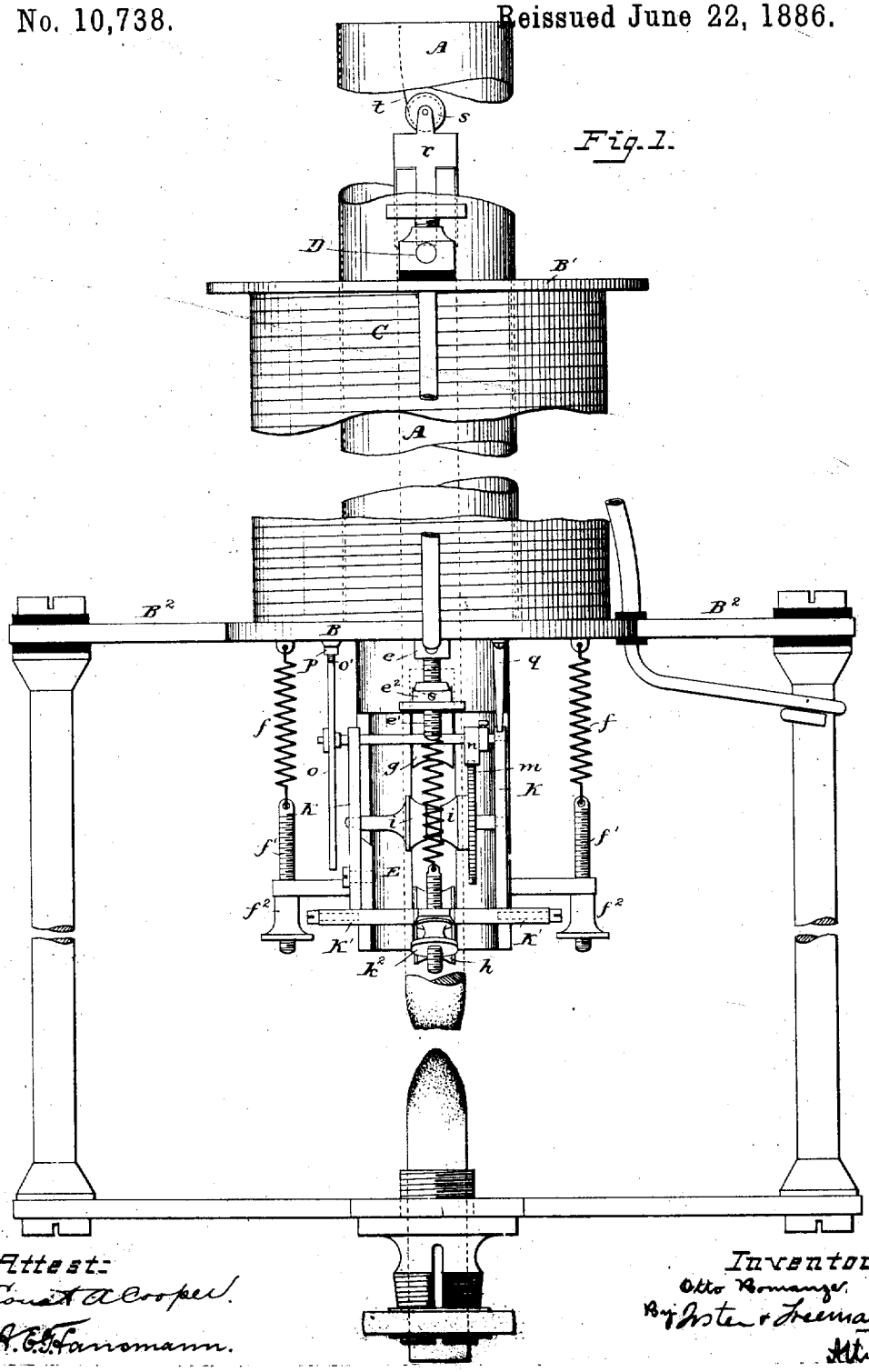
Attest:
Chas. A. Cooper.
A. C. Fanomann.
Inventor:
Otto Romanze.
By Foster & Freeman
Attys.

O. ROMANZE.
Assignor to MASON, THORNTON & ROMANZE.
ELECTRIC ARC LAMP.
No. 10,738. Reissued June 22, 1886.
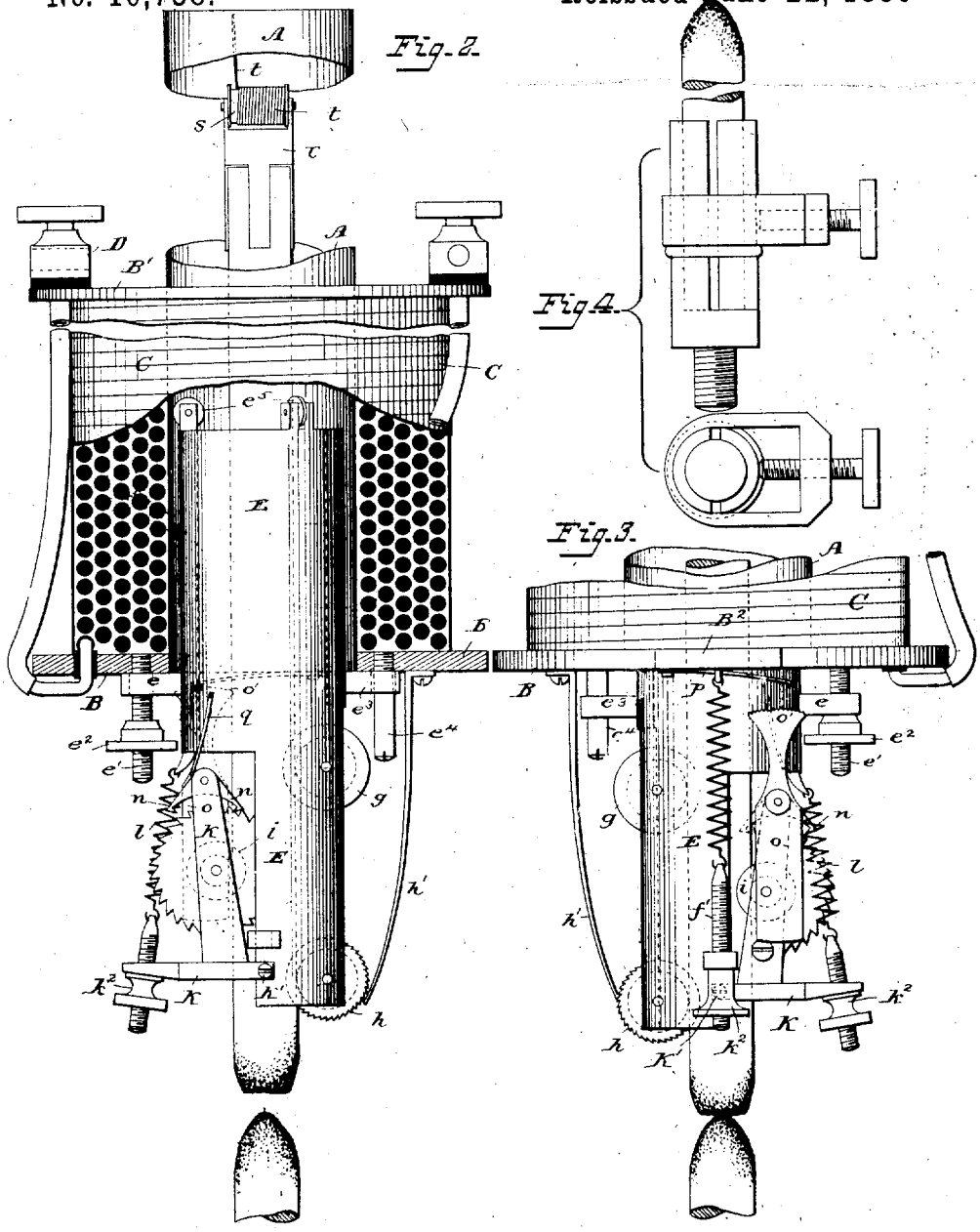
Attest:
Com. A. Cooper
A. E. Fansmann.
Otto Romanze
Inventor.
By Foster & Freeman
Attys.

UNITED STATES PATENT OFFICE.

OTTO ROMANZE, OF TONSLEY HILL, WANDSWORTH, LONDON, COUNTY OF SURREY, ASSIGNOR TO MASON, THORNTON & ROMANZE, OF WANDSWORTH, LONDON, ENGLAND.

ELECTRIC-ARC LAMP.

SPECIFICATION forming part of Reissued Letters Patent No. 10,738, dated June 22, 1886.

Original No. 330,351, dated November 10, 1885. Application for reissue filed March 25, 1886 Serial No. 196,571.

*To all whom it may concern:*

Be it known that I, OTTO ROMANZE, of 51 Tonsley Hill, Wandsworth, London, in the county of Surrey, Kingdom of Great Britain, have invented a new and useful Improvement in Electric-Arc Lamps, of which the following is a full, clear, and exact description.

In electric-arc lamps, as heretofore constructed, there were, as a rule, two distinct magnets or solenoids, one in the main lamp-circuit, which operated to establish the arc, and the other in a shunt around the arc, operating either alone or in conjunction with the first-named magnet or solenoid, to effect and control the feed of the upper carbon, or of both carbons. In all these lamps there are serious defects inherent in the principle of construction employed. The proper feed of the carbon or carbons is effected in such lamps only after the length of the arc has become unduly great, and the regulation, when it takes place, is instantaneous, and is ordinarily accompanied by a series of flashes, owing to the suddenness of the approach of the carbons, and to the fact that they approach nearer than required. In addition to this the proper relative resistances of the two solenoids or magnets can only be ascertained experimentally, and in order to satisfy the varying conditions of the lamp they should be ascertained for each individual lamp separately and for each set of carbons. Besides this, the employment of a high-resistance shunt-coil increases the cost of the lamp and introduces an element which gives rise to dangerous extra currents. It is also well known that all lamps constructed with a regulating-coil in a shunt around the arc are fitted for effective work only with a certain strength of current.

The object of my invention is to produce an electric-arc lamp which shall be free of the defects pointed out; and I reach this object by employing a single solenoid in the main circuit, which, in connection with suitable mechanism, operates both to establish and to regulate the arc.

In the following detailed description of my invention reference is made to the accompanying drawings, which form a part thereof, and in which—

Figure 1 represents a front elevation; Fig. 2, a side elevation, partly in section, of the entire lamp. Fig. 3 shows the automatic feed mechanism as seen from the opposite side to that shown in Fig. 2, and in a different position of the parts. Fig. 4 shows details of the lower-carbon holder.

The upper part of the lamp-frame consists of a metal tube, A, having upon it two flanges, B B′, between which is wound a solenoid-coil, C, which is placed in the lamp-circuit by being connected at one end to the terminal D and at the other with the tube A. This latter connection is not indicated in the drawings, but it will be understood that it may be effected by simply securing the second end of the solenoid to one of the flanges B or B′. The flange B has two oppositely-projecting arms, $B^2$, to which the rods carrying the support for the lower carbon are fixed, but from which they are insulated, and from one of these rods a wire passing through an insulating-bushing in flange $B^2$ connects with the second terminal or binding-post of the lamp, as indicated in Figs. 1 and 2.

Within the tube A and solenoid C is a tubular soft-iron core, E, which is capable of moving freely up and down therein, being guided in this movement by three small friction-rollers, $e^5$, mounted on its upper end and running against the interior of the tube A. The extent of the motion of the core is limited to about the maximum length of the arc which it is desired to maintain, by means of an arm, $e$, projecting from the core, and having a hole embracing freely a screw-stud, $e'$, fixed to and projecting from the under side of flange B, and provided with a nut, $e^2$, whereby the downward motion of the core is adjustably limited and the maximum distance between the carbons determined. The core is also guided by another and opposite arm, $e^3$, sliding on a smooth pin, $e^4$. The upward motion of the core is limited by the same arms coming in contact with the flange B of the frame.

A portion of the weight of the core and attached parts is sustained by springs $f$, connected to the under side of flange B, and to screws $f'$, passing through arms projecting from opposite sides of the core, near the lower end, and provided with nuts $f^2$, whereby the tension of the springs may be adjusted.

The upper carbon passes centrally through the tubular core D, and is supported and fed by the following mechanism carried by the core: $g$ $h$ are two concave rollers placed in line, one above the other, and mounted in a slot in one side of the core at about two inches apart, and $i$ is a similar roller placed at the opposite side of the carbon and opposite the middle of the space between $g$ and $h$, these three rollers presenting their concave peripheries to the carbon, and gripping it between them. The core E is cut away at the lower end at the side at which the roller $i$ is situated, and the axis of this roller is mounted in an oscillating bell-crank frame, K, pivoted at K′ to the core E, so that the roller $i$ can be moved toward and away from the carbon by rocking frame K on its pivot. A spring, $l$, is attached to the core and to an adjusting screw in the outer end of the horizontal arm of the frame K, whereby the roller $i$ is caused to press against the carbon sufficiently to prevent it slipping by its own weight, the tension of the spring being regulated by the screw. The rotation of the roller $i$ is controlled by an escapement consisting of a scape-wheel, $m$, fast on the axis of the roller $i$, an anchor, $n$, engaging with the wheel $m$, and a pendulum, $o$, fixed at the opposite end of the anchor-arbor, whereby the roller $i$ is prevented from rotating too rapidly, and thereby allowing the carbon to descend too fast. The rotation of the roller $i$ and the feed of the carbon are wholly arrested, when the core E is in its highest position, by a detent-spring, $p$, fixed to flange B, engaging with a fine toothed or milled edge of the quadrant-shaped upper end $o'$, of the pendulum $o$. A spring, $q$, is fixed to the under side of the flange B in such position that the upper end of the frame K will come in contact with it, when the core is raised to its highest position in such manner as to increase the pressure of the roller $i$ against the carbon, and more securely guard against the slipping down of the carbon when no further feed is required. The roller $h$ is ratchet-toothed, and a spring-pawl, $h'$, fixed to the frame B, engages with it, the inclination of the teeth and pawl being such that when, by the descent of the core, the wheel moves past the pawl, the latter holds a tooth of the wheel, which is thereby caused to revolve, for the purpose of giving a positive motion to the carbon, and so insuring the immediate commencement of its feed movement in case its own weight should be insufficient to overcome the inertia and friction of the mechanism. When the core moves upward, the inclined nib of the pawl yields and slips on the teeth of the roller without turning it.

The upper carbon has a metal cap-piece, $r$, fixed on its upper end, which serves both to weight it and to carry a metal roller $s$, about which is wound a wire cord, $t$, attached by its other end to the tube A, and which unwinds as the carbon descends, for the purpose of maintaining electrical connection between the tube A and the carbon in case the contact of the guide-rollers $g$ $h$ $i$ should become inefficient.

The action of the lamp is as follows: The carbons being in contact or sufficiently near for striking the arc on closing the circuit, the attraction of the solenoid for the core raises the latter until arms $e$ and $e^3$ abut against flange B. The core carries up with it the upper carbon, (held between the three rollers, as above described,) which is thus separated from the lower carbon the proper distance for establishing the arc. By the same upward movement the part $o'$ of the pendulum is brought against the detent $p$, whereby the roller $i$ is prevented from turning, the spring $l$ being now re-enforced by spring $q$, to prevent the carbon slipping. As the carbons burn away, the resistance of the arc increases and the strength of the current diminishes until the solenoid can no longer sustain the core in its highest position, whereupon it falls slightly, and by this motion the roller $h$ is caused by pawl $h'$ to rotate, as above described, and impart to the upper carbon a downward movement in excess of the descent of the core which carries it. The same movement of the core liberates the pendulum from the detent $p$, whereupon the carbon will continue to descend by its own weight under the control of the escapement and pendulum, which is caused to vibrate by the rotation of the roller $i$. This only continues until, by the shortening of the arc, the strength of the current is increased sufficiently to enable the solenoid to raise the core again, whereupon the vibration of the pendulum is stopped and the upper carbon held as before.

It will be observed that incidental to the use of a single solenoid for establishing and controlling the arc, mechanism had to be provided for rendering the gravity-feed of the carbon intermittent, which is accomplished by the pendulum and escapement. On the other hand means for insuring the prompt commencement of the gravity-feed had to be provided, and these means are found in the toothed roller $h$ and spring-pawl $h'$. The initial movement of the upper carbon is, therefore, of a complex nature, descending as it does with the core, impelled by the gravity of the latter, and beyond the core, or in advance of the same, impelled positively by the action of pawl $h'$ upon roller $h$.

These are important features of my invention, and while other mechanism may be employed in connection with an arc lamp having a single solenoid, the principles involved in the construction shown should be preserved.

I claim as new and desire to secure by Letters Patent—

1. In an electric-arc lamp, the combination, with a single solenoid in the lamp-circuit, of a soft-iron core carrying and guiding the upper carbon, intermittent gravity-feed mechanism and positive feed mechanism, both controlled by said core.

2. In an electric-arc lamp, the combination of the upper carbon feeding by gravity with pendulum and detent mechanism for rendering such feed gradual and intermittent and a single solenoid in the lamp-circuit, said solenoid having a core which operates to lock and to release the pendulum, substantially as described.

3. In an electric-arc lamp having a single solenoid in the lamp-circuit, the combination of intermittent gravity-feed mechanism actuated by the weight of the upper carbon with positive feed mechanism actuated by the weight of the core of the solenoid, substantially as described.

4. In an electric lamp, the combination, with a solenoid in the lamp-circuit, of a tubular soft-iron core through which the upper carbon passes, provided with guide-rollers to hold the carbon, and of automatic feed mechanism consisting of a pressing-roller mounted in a frame pivoted to the core and pressed against the carbon by springs, and of an escapement and pendulum controlling the revolution of the said roller, and a spring-detent for arresting its motion, whereby the feeding of the upper carbon is effected and governed, substantially as described.

5. In an electric-arc lamp, the combination, with the solenoid, tubular core, guide-rollers, rocking frame, escapement mechanism, pendulum, and detent, combined for operation as described, of a pawl engaging with ratchet-teeth on one of the guide-rollers, not controlled by the escapement mechanism, for the purpose of causing an initial motion to be imparted to the carbon independently of the core and by the descent of the latter, substantially as described.

In testimony whereof I affix my signature in presence of two witnesses.

OTTO ROMANZE.

Witnesses:
JOSEPH LYONS,
B. REHFUESS.